(No Model.)
W. H. LEWIS.
LAWN RAKE.
No. 567,602. Patented Sept. 15, 1896.
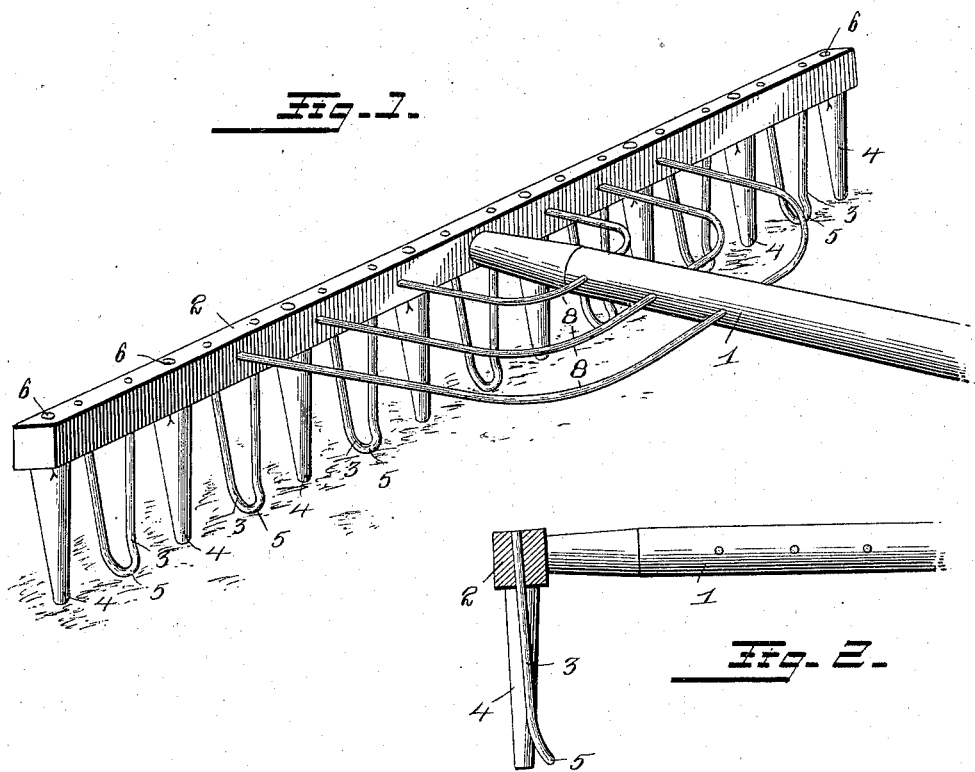
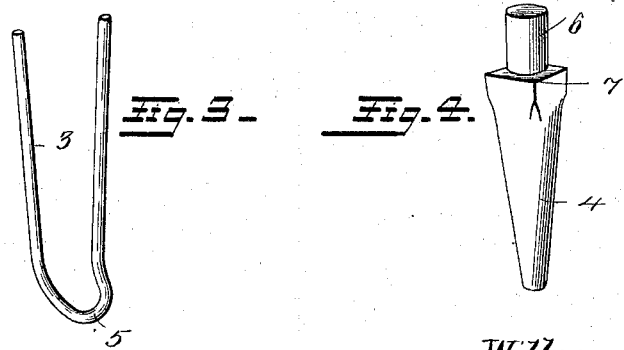
Witnesses
H. J. Koerth.
R. M. Smith.
Inventor
William H Lewis,
By his Attorneys,
C. A. Snow & Co.

UNITED STATES PATENT OFFICE.

WILLIAM H. LEWIS, OF ROME, NEW YORK.

LAWN-RAKE.

SPECIFICATION forming part of Letters Patent No. 567,602, dated September 15, 1896.

Application filed November 14, 1895. Serial No. 568,940. (No model.)

*To all whom it may concern:*

Be it known that I, WILLIAM H. LEWIS, a citizen of the United States, residing at Rome, in the county of Oneida and State of New York, have invented a new and useful Lawn-Rake, of which the following is a specification.

This invention relates to an improvement in lawn-rakes, and has for its object to provide a simple, inexpensive, and efficient lawn-rake which may be used in the harvesting of grass, hay, &c., and which is adapted to ride freely and smoothly over the surface of the ground without liability of penetrating the soil and disturbing or injuring the roots of the grass, &c.

A further object of the invention is to render the rake more efficient in operation by constructing and arranging the teeth thereof in such manner that they will be self-clearing.

With the above objects in view the invention consists in certain novel features and details of construction and arrangement of parts, as hereinafter fully described, illustrated in the drawings, and finally pointed out in the claim.

In the accompanying drawings, Figure 1 is a perspective view of a rake-head constructed in accordance with the present invention. Fig. 2 is a vertical transverse section through the rake-bar. Fig. 3 is a detail perspective view of one of the wire teeth. Fig. 4 is a similar view of one of the wooden teeth.

Similar numerals of reference designate corresponding parts in the several figures of the drawings.

Referring to the accompanying drawings, 1 designates a suitable handle, to the extremity of which is secured a transversely-disposed cross-bar 2, constituting the rake-head, to which the rake-teeth are affixed. This rake-head is formed with a plurality of vertical perforations, some of which receive the bases or upper ends of a series of wire teeth 3, and others of which receive the bases or upper ends of a corresponding series of wooden teeth 4.

The wire teeth 3 are each formed from a single section of wire of any desired gage, preferably hard or rolled wire, combining the desired degrees of strength and elasticity. The wire-blanks of which these teeth are formed are bent into substantially U shape, the central bend 5 therein forming the vertex or point of the tooth, while the terminals are passed through perforations in the rake-head and tightly driven therein, so as to be firmly retained in place. The wooden teeth 4 are made slightly tapering toward their points, and each is formed with a reduced upper end 6, which is inserted in a perforation or socket in the rake-head, the reduction of the upper end of the tooth forming a shoulder 7, which abuts against the lower surface of the rake-head and regulates the position of the tooth.

The wire and wooden teeth, formed as above described, are arranged in substantially the same plane and in alternating series, as illustrated in Fig. 1, and under such arrangement the wooden teeth, by reason of their blunt points, ride upon the surface of the ground and serve as guards for the wire teeth, preventing the latter from penetrating the soil and injuring the turf. The lower ends or points of the wire teeth are also deflected forwardly or projected into a plane in advance of and parallel with the plane in which the points of the wooden teeth lie. The points of all the teeth, wire and wood, thus contribute to establish a wide and extended bearing upon the ground, rendering it almost impossible for a careless operator to injure the sod. In addition to the advantage just mentioned, it will also be seen that by reason of the rounded vertices of the wire teeth, taken in connnection with the blunt points of the wooden teeth, there will be little liability of any of the teeth puncturing or impaling blades of grass, leaves, &c., and the rake will thus be self-clearing and cannot clog; also, that by reason of the lower extremities of the wire teeth being deflected forward into a plane in advance of the extremities of the wooden teeth, the wire teeth may be thrown into contact with the ground or may be lifted entirely clear thereof by holding the rake-handle at suitable inclinations. By depressing the handle 1 the metal teeth will touch the ground, and by elevating said handle the said teeth will be lifted clear of the ground, thus leaving only the wooden teeth in contact therewith and avoiding any injury which the metal teeth might do to the sward.

8 indicates a series of guards formed from sections of wire bent into substantially semicircular form and passed at their central portions through openings in the rake-handle and fastened at their extremities in perforations in the rake-head. These guards are arranged in parallel or concentric relation, and together form an effective superposed guard for preventing the material being raked from heaping up and passing over the rake-bar.

The rake hereinabove described is thus very simple and inexpensive in construction, reliable and efficient in use, and may be used with safety upon the finest sward.

Changes in the form, proportion, and minor details of construction may be resorted to without departing from the spirit or sacrificing any of the advantages of this invention.

Having thus described the invention, what is claimed as new is—

A lawn-rake, comprising a handle, a rake-head and alternating series of wooden and wire teeth, the wire teeth being arranged in the same plane with the wooden teeth, except as to their points which are deflected into a plane in advance of the wooden teeth, whereby the operative positions of the two sets of teeth may be varied by changing the inclination of the handle, substantially as described.

In testimony that I claim the foregoing as my own I have hereto affixed my signature in the presence of two witnesses.

WILLIAM H. LEWIS.

Witnesses:
   F. LOUIS ROTH,
   G. M. PALMER.